United States Patent [19]

Anderson

[11] 4,427,842
[45] Jan. 24, 1984

[54] FEEDTHROUGH APPARATUS

[75] Inventor: Harry V. Anderson, Minneapolis, Minn.

[73] Assignee: Rosemount Inc., Eden Prairie, Minn.

[21] Appl. No.: 357,463

[22] Filed: Mar. 12, 1982

[51] Int. Cl.³ .................... H02G 3/22; H02G 15/013
[52] U.S. Cl. .................................. 174/77 R; 174/151
[58] Field of Search .................. 174/77 R, 50.56, 151; 338/273, 274

[56] References Cited

U.S. PATENT DOCUMENTS

| | | | |
|---|---|---|---|
| 2,468,985 | 5/1949 | Krotz | 174/151 |
| 2,785,270 | 3/1957 | Burger | 338/274 |
| 3,601,526 | 8/1971 | Bohne | 174/77 R X |
| 3,710,003 | 1/1973 | Channell | 174/77 R X |
| 4,178,497 | 12/1979 | Cunningham | 174/77 R X |
| 4,326,016 | 4/1982 | Selover, Jr. et al. | 174/77 R X |

FOREIGN PATENT DOCUMENTS 1648163  4/1970  Fed. Rep. of Germany ...... 174/151
461239  2/1937  United Kingdom ............. 174/77 R Primary Examiner—Morris H. Nimmo
Attorney, Agent, or Firm—Kinney, Lange, Braddock, Westman and Fairbairn

[57] ABSTRACT

A feedthrough apparatus for passing signals through a bulkhead. The feedthrough apparatus has a header shell with a header shell opening therethrough with a swage duct inserted in the header shell opening. An end of the swage duct extends out of the header shell opening and has a communicative means inserted therethrough. A swage plate opening formed in a swage plate is fitted over the end of the swage duct extending out of the header shell opening and is constructed so as to swage the swage duct about the communicative means, securing the communicative means in the swage duct and providing a hermetic seal for the communicative means.

12 Claims, 10 Drawing Figures

U.S. Patent    Jan. 24, 1984    4,427,842
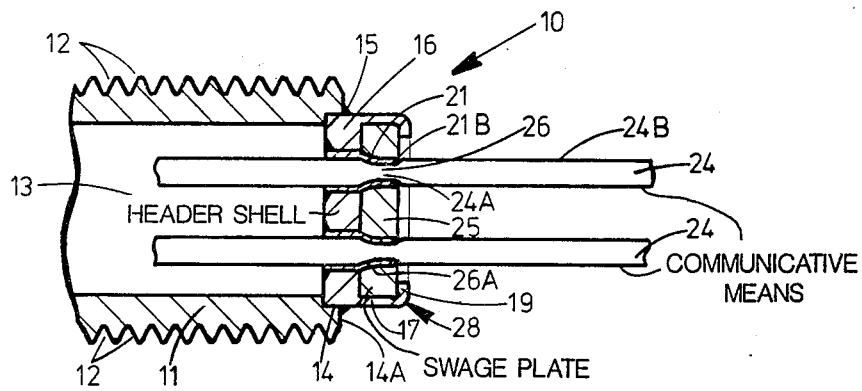
FIG. 1
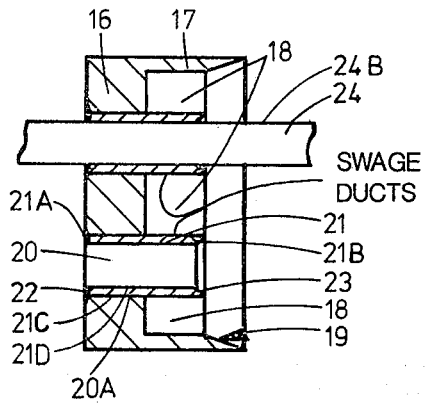
FIG. 2
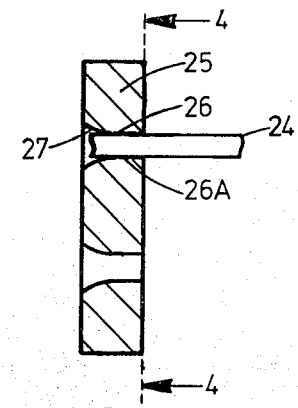
FIG. 3
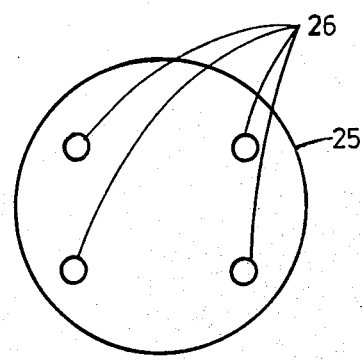
FIG. 4
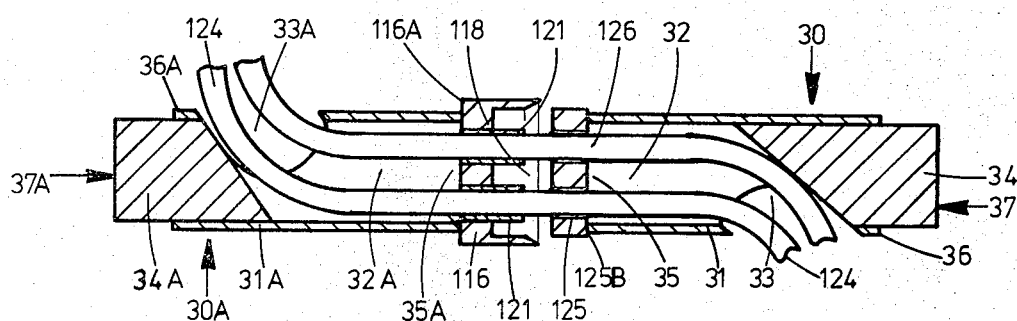
FIG. 5
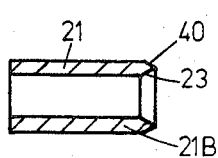
FIG. 6
FIG. 7
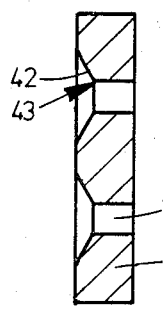
FIG. 8
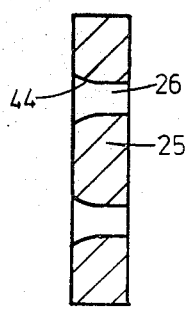
FIG. 9
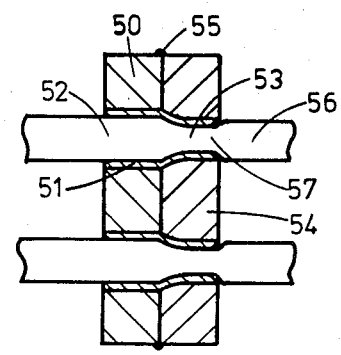
FIG. 10

FEEDTHROUGH APPARATUS

BACKGROUND OF THE INVENTION

1. Field of the Invention

The present invention relates to a feedthrough apparatus used to feed a communicative means through a bulkhead.

2. Description of the Prior Art

Epoxy, cements or other adhesive materials are used to secure and seal a communicative means when such communicative means is fed through a bulkhead. In one embodiment, a tube was inserted through the bulkhead and with the communicative means fed through the tube, then an adhesive material was poured into the tube to secure and seal the communicative means in the tube. While this embodiment may have been effective at constant temperatures, one problem is that variable temperatures pose a problem because of the differences in expansion coefficients between the adhesive material, the tube and the communicative means. The adhesive material tends to crack with changes in temperature, hence creating leaks.

SUMMARY OF THE INVENTION

The present invention comprises a feedthrough apparatus for passing signals through a bulkhead. The feedthrough apparatus comprises a header shell with a header shell opening formed therethrough. A swage duct means is inserted in the header shell opening and affixed such that part of the swage duct means extends a desired distance out of the header shell opening. A communicative means, providing a passageway for such signals, is disposed in the swage duct means. The communicative means is also fed through a swage plate opening which is formed through a swage plate means. The swage plate opening is formed smaller than the outside periphery of the swage duct means. When the swage duct means is disposed in the swage plate openings, the swage duct means is swaged about the communicative means securing and sealing the communicative means therein. One advantage of the present invention is that the communicative means is sealed in the swage duct means without the requirement of epoxy, cements or other adhesive materials. Another advantage of the present invention is reduced costs of manufacture resulting in part from reduced assembly time from not having to wait for epoxy or cements to dry. Yet another advantage of the present invention is that when compatable metals are used to construct the apparatus, the invention is not adversely affected by normal conditions such as temperature variations. Further advantages are apparent from the description of the preferred embodiment of the invention.

BRIEF DESCRIPTION OF THE DRAWINGS

FIG. 1 is a sectional view of a preferred embodiment of a feedthrough apparatus inserted into a housing showing a communicative means disposed therethrough;

FIG. 2 is a sectional view of a header shell and a swage duct means of the feedthrough apparatus of FIG. 1;

FIG. 3 is a sectional view of a swage plate means of the feedthrough apparatus of FIG. 1;

FIG. 4 is a plan view of the swage plate means taken as on line 4—4 of FIG. 3;

FIG. 5 is a sectional view of a swaging apparatus and a second swaging apparatus adjacent a sectional view of the feedthrough apparatus of FIG. 1 used to dispose the swage plate means into the header shell;

FIG. 6 is a sectional view of a further preferred embodiment of the swage duct means of the feedthrough apparatus of FIG. 1;

FIG. 7 is a sectional view of yet a further preferred embodiment of the swage duct means of the feedthrough apparatus of FIG. 1;

FIG. 8 is a sectional view of a further preferred embodiment of the swage plate means of the feedthrough apparatus of FIG. 1;

FIG. 9 is a sectional view of yet a further preferred embodiment of the swage plate means of the feedthrough apparatus of FIG. 2; and FIG. 10 is a sectional view of a further preferred embodiment of the feedthrough apparatus.

DETAILED DESCRIPTION OF THE PREFERRED EMBODIMENT

Referring to FIG. 1, a preferred embodiment of a feedthrough apparatus indicated generally at 10 is inserted into a housing 11. Housing 11 is formed of metal, plastic or other suitable material and preferably is threaded as shown at 12 so that housing 11 can be securely fastened to a bulkhead or positioned as desired. Housing 11 has a cavity 13 and has a groove 14 formed at an end 14A. Feedthrough apparatus 10 is inserted into groove 14 of housing 11 and affixed thereto as by a continuous weld 15 when the feedthrough apparatus 10 and housing 11 are formed from compatable metals. Feedthrough apparatus 10 can also be affixed directly to a bulkhead or wall.

Referring to FIG. 2, a header shell 16 is constructed of metal, plastic or other suitable material. A header shell cavity 18 is formed therein as by boring, leaving an annular header shell tab means 17, also called securing means, extending from header shell 16. Header shell tab means 17 may have a taper 19. A header shell opening 20 is formed as by boring through header shell 16. Additional header shell openings 20 can be bored as desired. A swage duct means 21 having an outer periphery 21C which substantially conforms to an interior surface 20A of header shell opening 20, such as a cylindrical conduit made of malleable metal, plastic or other suitable material is disposed through header shell opening 20 and a first end 21A of swage duct means 21 is secured to header shell 16 as by an annular weld 22 when swage duct means 21 and header shell 16 are formed from compatable metals. Additional swage duct means 21 can be similarly disposed in other header shell openings 20 as desired. Swage duct means 21 provides a conduit for a desired communicative means 24 for carrying signals such as electrical, pneumatic, visible light, defined as including electromagnetic radiation in the infrared, visible, and ultraviolet portions of the spectrum or other signals through a bulkhead. Swage duct means 21 protrudes out of header shell 16 into header shell cavity 18 a desired distance, which in one preferred embodiment was approximately the same protrusion as header shell tab means 17 to taper 19. A chamfer 23 may be made inside of a second end 21B or inside of first end 21A of swage duct means 21 and communicative means 24, having an outer periphery 24B slightly smaller than and substantially conforming to an interior surface 21D of swage duct means 21, is then disposed therethrough extending a desired distance beyond first end 21A and second end 21B of swage duct means 21. The chamfer 23 facilitates smooth insertion of communicative means 24.

Referring to FIG. 3, a swage plate means 25 preferably is formed from a relatively flat disk of metal, plastic or other suitable material with at least one swage plate opening 26 formed therethrough, as by boring, and, as desired, additional swage plate openings 26 formed therethrough to conform to the arrangement of swage duct means 21 on header shell 16.

Referring, for example, to FIG. 4, a preferred embodiment of swage plate means 25 comprises four (4) swage plate openings 26.

As perhaps best shown in FIG. 1, communicative means 24 extends from second end 21B of swage duct means 21 and is fed through swage plate opening 26 (FIG. 3). The surface of an inner periphery 26A of swage plate opening 26 is constructed smaller than and substantially conforming to the surface of the outer periphery 21C of swage duct means 21 such that when swage plate means 25 is disposed in header shell cavity 18 swage duct means 21 and communicative means 24 are compressed and swage duct means 21 is urged by swage plate means 25 into a close mechanical coupling of these elements resulting in a swaged area 24A of communicative means 24 which secures and seals communicative means 24 in swage duct means 21. To further ensure correct compressing of swage duct means 21 by swage plate opening 26, a swage duct guide means 27 is formed in swage plate opening 26 where swage plate opening 26 first comes into contact with second end 21B of swage duct means 21 during the deposition of swage plate means 25. Swage duct guide means 27 preferably is of a rounded construction to smooth deposition and to control galling of swage duct means 21 during the deposition of swage plate means 25. A suitable lubricant such as bees wax, silicon or oil may able be applied to the surface of the inner periphery 26A of swage plate opening 26 to smooth deposition and to control galling of swage duct means 21 during the deposition of swage plate means 25. When swage plate means 25 is disposed in header shell 16, taper 19 of header shell tab means 17 is formed onto swage plate means 25 as at 28 to secure swage plate means 25 to header shell 16.

Communicative means 24 preferably is coated with compliant material or insulation such as tetrafluoroethylene, rubber or other suitable compliant material such that when communicative means 24 is swaged at swaged area 24A of communicative means 24, communicative means 24 is secured and sealed in swage duct means 21 preferably without the use of adhesives. Annular weld 22 secures and seals the outer periphery 21C of swage duct means 21 to the interior surface 20A of header shell opening 20 which when combined with the swaging provided at swaged area 24A about communicative means 24 and with suitable plugs providing a seal in all header shell openings 20 not having swage duct means 21 and communicative means 24, disposed therethrough, an effective seal with swage duct means 21 in header shell 16 is thus formed. Such seal can be an impervious, fluidic seal. Feedthrough apparatus 10 provides such seal over a wide range of temperatures and avoids the problems of previous epoxy, cement or adhesive seals as such adhesive seals tend to weaken or fracture when exposed to temperature variations. This is caused by the expansion coefficients of the feedthrough apparatus materials. When feedthrough apparatus 10 is properly disposed in a bulkhead, the bulkhead remains impervious to a selected condition or conditions such as fluids, visible light or the like.

The dimensions of swage plate opening 26 and swage duct means 21 depend upon the strength of seal desired, thickness of insulation on communicative means 24 and resistance of communicative means 24 to damage from swaging and other factors. In one preferred embodiment, communicative means 24 is a nickel coated copper wire, conforming to a military specification published by the Department of Defense, specifically MIL-W-16878/4-26-3. Such wire is coated with tetrafluoroethylene insulation. In this embodiment, communicative means 24 had a total diameter of approximately 0.109 centimeters. Swage duct means 21 was constructed of a suitable alloyed metal having high strength properties, such as INCONEL alloy 600 (a Registered Trademark of Huntington Alloys, Inc.) with an outer diameter of approximately 0.175 centimeters and an inner diameter of approximately 0.124 centimeters. Swage plate means 25 was also constructed of INCONEL alloy 600 with swage plate opening 26 of diameter of approximately 0.147 centimeters and swage duct guide means 27 having a radius of curvature of approximately 0.191 centimeters. With communicative means 24 fed through swage duct means 21 and through swage plate opening 26, swage duct means 21 was urged into swage plate opening 26. Since swage plate means 25 is more rigid than swage duct means 21 and, since swage plate opening 26 was of a smaller diameter than the outer diameter of swage duct means 21, swage duct means 21 was compressed onto communicative means 24 resulting in the swaged area 24A of communicative means 24 having a diameter of approximately 0.097 centimeters. This embodiment produced a hermetic seal between communicative means 24 and swage duct means 21. The dimensions of feedthrough apparatus 10 are calculated in a known manner and varied to accommodate the dimensions of communicative means 24 to be fed through a bulkhead so as to provide a desired seal while not substantially impairing the insulative value of the insulation. It is further noted that the compliant nature of such insulation when swaged provides a desired seal for broad temperature variations.

In a further preferred embodiment of the feedthrough apparatus 10, interior surface 21D of swage duct means 21 is coated with insulation such as tetrafluoroethylene, rubber or other suitable material. In this embodiment, communicative means 24 may be a bare copper wire or unshielded optical carrier. Communicative means 24 is then swaged at swaged area 24A by swage duct means 21, thus securing and sealing communicative means 24 in feedthrough apparatus 10.

Referring to FIG. 5, a swaging apparatus indicated generally at 30, and a second swaging apparatus indicated generally at 30A preferably are used to dispose a swage plate means 125 in a header shell 116. Swage plate means 125 is in accord with FIG. 3, and comprises a swage plate opening 126 and an outer periphery 125B. Header shell 16 is in accord with FIG. 2 and comprises a header shell cavity 118, an outer periphery 116A and a plurality of swage duct means 121 disposed therethrough. Swaging apparatus 30 comprises a housing 31 having a cavity 32 defined therein, an opening 33, a solid fitting 34 affixed securely in an end 36 of housing 31 and an open end 35 of housing 31. Second swaging apparatus 30A comprises a housing 31A having a cavity 32A defined therein, an opening 33A, a solid fitting 34A affixed securely in an end 36A of housing 31A, and an open end 35A of housing 31A. Swaging apparatus 30 and second swaging apparatus 30A are used to dispose swage plate means 125 in header shell cavity 118. Open end 35 of housing 31 is shaped to conform to outer periphery 125B of swage plate means 125. Open end 35A of housing 31A is shaped to conform to the outer periphery 116A of header shell 116. With a communicative means 124 disposed in swage duct means 121 and through swage plate opening 126, open end 35 of housing 31 is placed on the outer periphery 125B of swage plate means 125, and open end 35A of housing 31A is placed on the outer periphery 116A of header shell 116. Communicative means 124 is positioned through opening 33 and opening 33A, respectively, such that virtually no pressure, other than pressure applied by swage duct means 121, is applied to communicative means 124. Force, in the directions indicated by arrows 37 and 37A is applied to solid fitting 34 and solid fitting 34A thus urging swage plate means 125 into header shell cavity 118 and causing swage duct means 121 to compress communicative means 124.

An advantage of feedthrough apparatus 10 is that it provides a means for feeding communicative means 24 through bulkheads where a seal such as a hermetic seal is desired. It also mechanically secures communicative means 24, thus providing strain relief for mechanical forces applied to communicative means 24 on either side of the swaging apparatus 10.

Feedthrough apparatus 10 used in conjunction with housing 11 as seen in FIG. 1 can be used to feed communicative means 24 through a pipe or vessel bulkhead to a temperature sensor, such as the temperature sensor described in U.S. Pat. No. 3,761,857 or other devices. When housing 11 is threaded as shown at 12 and properly mated with similar receiving threads to provide a desired seal, feedthrough apparatus 10 provides for signals to be transmitted from such sensor or device in the pipe by communicative means 24 through such seal to a desired destination external from such pipe or vessel.

In FIG. 6, a preferred embodiment of swage duct means 21 comprises a chamfer 40 formed on the exterior of second end 21B of swage duct means 21 adjacent to chamfer 23 to assist in deposition of swage plate means 25 by guiding swage plate means 25 onto swage duct means 21. Referring to FIG. 7, a further preferred embodiment of swage duct means 21 comprises a rounded shape 41 formed on second end 21B of swage duct means 21 and provides guiding as well as facilitating insertion of communicative means 24 into swaged duct means 21.

Referring to FIG. 8, a preferred embodiment of swage plate means 25 comprises a tapered straight edge guide 42 formed, as by boring, thus forming a transition 43 at swage plate opening 26. Tapered straight edge guide 42 guides swage plate means 25 onto swage duct means 21 while transition 43 controls galling of swage duct means 21 during deposition resulting in a desired method of securing communicative means 24 in swage duct means 21. In FIG. 9, a further preferred embodiment of swage plate means 25 comprises a tapered gradual guide 44 formed as by boring and tapering into swage plate opening 26. Tapered gradual guide 44 is useful where one or more swage duct means 21 must be swaged. Without tapered gradual guide 44, if swage duct means 21 and swage plate opening 26 are not precisely aligned, large bending moments may occur on swage duct means 21 adjacent to the surface of header shell 16 possibly damaging swage duct means 21 and communicative means 24. With tapered gradual guide 44, precise alignment of swage duct means 21 and swage plate opening 26 is not required because tapered gradual guide 44 is formed such that swage duct means 21 is not in contact with tapered gradual guide 44 directly adjacent to the surface of header shell 16. This results in smaller, acceptable bending moments occurring on swage duct means 21.

In FIG. 10, one form of feedthrough apparatus 10 comprises a header shell 50. Header shell 50 differs from header shell 16 in that header shell 50 does not have the header shell tab means 17 of header shell 16 but is otherwise constructed similar to header shell 16 with a swage duct means 51 disposed through a header shell opening 52. A communicative means 56 is disposed in swage duct means 51 and a swage plate means 54 is constructed in accord to swage plate means 25 with a swage plate opening 53 to cause swage duct means 51 to swage communicative means 56 at a swaged area 57 when swage duct means 51 is disposed in swage plate opening 53. In this embodiment, swage plate means 54 is affixed securely to header shell 50 by a continuous weld 55, also called securing means, while swage plate means 54 is held adjacent to header shell 50 such as by a clamp.

What is claimed is:

1. A feedthrough apparatus for a bulkhead comprising:
   a header shell with header shell openings therethrough;
   swage duct means having a portion thereof mounted in and opening through the header shell;
   communicative means for transferring signals through the bulkhead disposed in the swage duct means; and
   swage plate means having swage plate openings therethrough for receiving the swage duct means therein and being of size to swage the swage duct means onto the communicative means when the swage duct means is in position within the swage plate means.

2. The apparatus of claim 1 wherein one of the communicative means and the swage duct means has compliant material thereon for providing a seal between surfaces thereof when the swage duct means is in position in the swage plate means.

3. The apparatus of claim 2 wherein the swage duct means has compliant material disposed therein for providing a seal when the communicative means is swaged.

4. The apparatus of claim 2 wherein the communicative means has compliant material thereon for providing a seal when the communicative means is swaged.

5. The apparatus of claim 2 wherein the dimensions of the header shell, the swage plate means, the swage duct means and communicative means are selected such that the feedthrough apparatus remains impervious to at least one selected condition.

6. The apparatus of claim 5 wherein the swage plate means is moved to position adjacent the header shell to swage the swage duct means onto the communicative means, and wherein the swage plate means has swage duct guide means therein for guiding the swage duct means as the swage plate means is moved adjacent the header shell.

7. The apparatus of claim 2 wherein the header shell has securing means supported thereon for securing the swage plate means to the header shell.

8. The apparatus of claim 2 wherein the swage duct means has chamfer means thereon for guiding the communicative means during disposition of the communicative means into the swage duct means.

9. A feedthrough apparatus for supporting signal conductors that extend through a bulkhead comprising:
- a header shell adapted to be mounted in a bulkhead opening, said header shell having header shell openings therethrough;
- tubular duct means having outer surfaces sealingly supported in the header shell openings and defining passageways through the header shell, a portion of the tubular duct means extending outwardly from the header shell on one side thereof;
- an elongated signal conductor disposed in each tubular duct means for transmitting signals along the length thereof;
- a swage plate having openings therethrough of smaller size than the outer surfaces of the tubular duct means and effective to swage the tubular duct means onto the conductors supported in such duct means when the swage plate is moved to position adjacent the header shell; and
- means for supporting the swage plate in position adjacent the header shell.

10. The apparatus of claim 9 wherein the header shell comprises a wall having a generally planar surface, the tubular duct means extending outwardly from said surface, and said swage plate being held contiguous to the planar surface of the wall.

11. The apparatus of claim 9 wherein said header shell defines a recess of size to receive the swage plate, when the swage plate is moved to its position adjacent the header shell.

12. The apparatus of claim 11 wherein said recess is defined by a wall having edge portions that are bent over the edges of the swage plate to hold the swage plate in its position adjacent the header shell.

* * * * *

UNITED STATES PATENT AND TRADEMARK OFFICE
CERTIFICATE OF CORRECTION

PATENT NO. : 4,427,842
DATED : January 24, 1984
INVENTOR(S) : Harry V. Anderson

It is certified that error appears in the above-identified patent and that said Letters Patent is hereby corrected as shown below:

Column 3, line 37 "able" should be --also--.
Column 4, line 60, "16" should be --116--.

Signed and Sealed this

Twenty-fourth Day of April 1984

[SEAL]

Attest:

GERALD J. MOSSINGHOFF

*Attesting Officer*  *Commissioner of Patents and Trademarks*